UNITED STATES PATENT OFFICE.

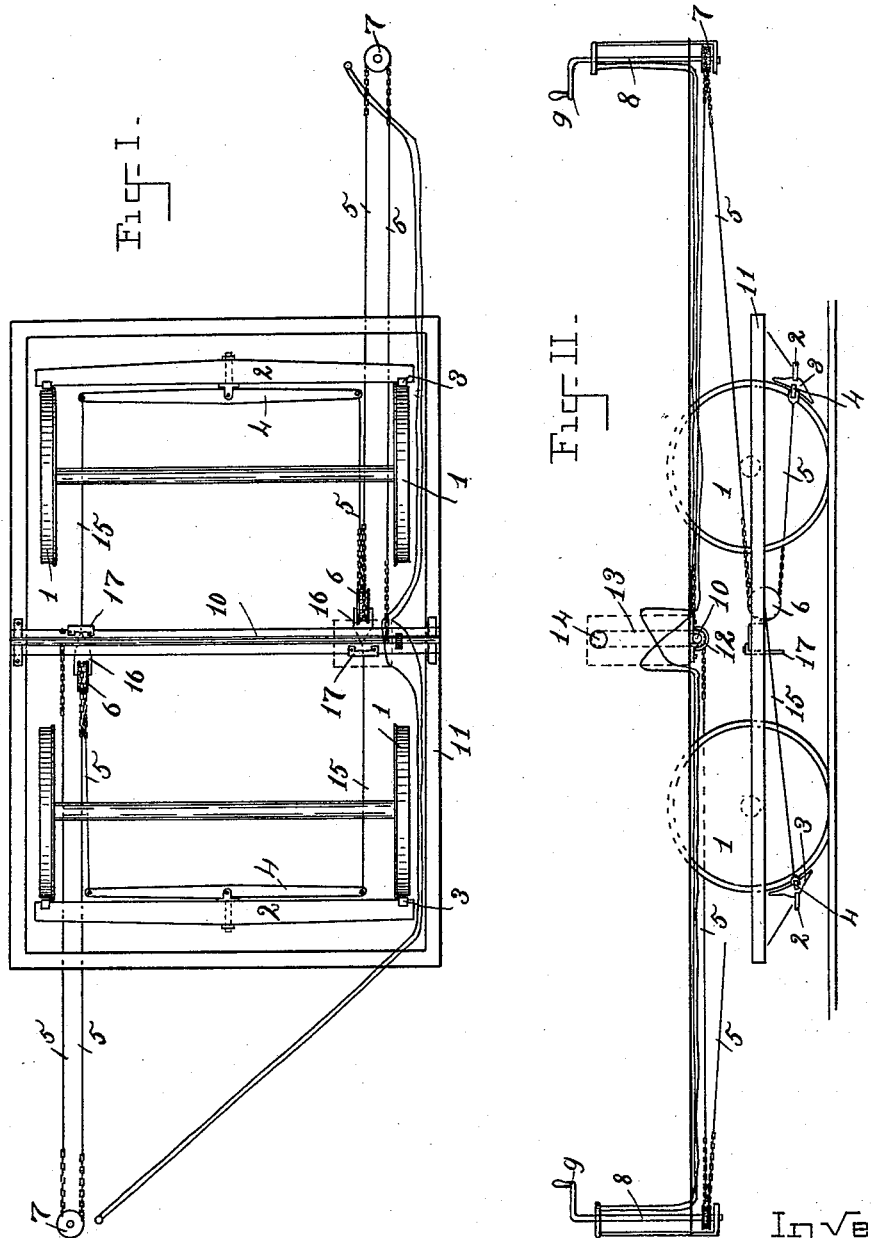

ROBERT H. BULLOCH AND JOHN W. MALLARD, OF SAVANNAH, GEORGIA.

RAILWAY-BRAKE.

SPECIFICATION forming part of Letters Patent No. 524,037, dated August 7, 1894.

Application filed February 15, 1893. Serial No. 462,368. (No model.)

*To all whom it may concern:*

Be it known that we, ROBERT H. BULLOCH and JOHN W. MALLARD, citizens of the United States, residing at Savannah, county of Chatham, State of Georgia, have invented certain new and useful Improvements in Brake Mechanisms, of which the following is a specification.

The object of our invention is to provide improved means for applying brakes to wheels being especially adapted for use on cars having electric motors which may be used to operate the brake although the latter may be operated by hand when desired.

The invention consists in the novel details of improvement and the combinations of parts which will be more fully hereinafter set forth and then pointed out in the claims.

Referring to the accompanying drawings which form a part of this specification:—Figure I is a plan view of a portion of a car body and its trucks having our improvements applied. Fig. II is a side elevation of the same.

In the drawings, 1 indicates the car wheels and 2 is the brake beam carrying shoes 3 all of which may be of ordinary or suitable construction.

To the beams 2 are pivotally connected levers 4 one end of each of which levers is provided with a rod and chain or other suitable connection 5 that passes over a pulley 6 and from thence to and around a pulley or wheel 7 suitably pivoted on the car body and shown carried by brake bar 8 having handle 9 which may be of ordinary or suitable construction. The construction 5 is shown partly in the form of a rod and partly consisting of a chain at that portion that passes around the pulleys 6 and 7 but its construction may be otherwise suitably arranged. The pulley 7 may be in the form of a sprocket wheel to receive the chain portion of the connection 5 to permit the latter to be operated by the crank 9. Or, the connection between the pulley or wheel 7 and the connection 5 may be otherwise arranged to permit the said pulley or wheel to operate said connection 5.

The inner or free ends of the connections 5 are, or may be, attached to and wind upon, a brake axle 10 suitably journaled in supports on the car body or truck 11. The shaft 10 may be turned by suitable means to operate brakes and for this purpose, I have shown a pulley or sprocket wheel 12 carried by said shaft 10 over which an endless chain or the like 13 passes, the latter also passing over a pulley or sprocket wheel 14 connected with suitable driving mechanism as, for instance, an electric motor. Suitable connections being provided for permitting the wheel 14 to be turned when desired, the shaft 10 may be turned to wind up the connection 5 and thus apply the brakes to the wheels.

For convenience in operating the brakes simultaneously when applied to two or more sets of wheels, the levers 4 at their ends opposite their attachment to connection 5 are provided with rods or connections 15 to which the pulleys 6 are suitably pivoted so that when a pulley 6 is drawn by the connection 5 toward one end of the car, the levers 4 will operate to press the shoes 3 against the wheels. In the drawings, we have shown the pulleys 6 as journaled in a forked support 16 carried by rods 15, the rods 15 passing through a suitable hanger or bearing 17 supported by the car body or truck 11.

To apply the brakes, the shaft 10 is turned to wind up the connections 5 each of which will draw its corresponding pulleys 6 toward one end of the car (the pulleys 6 now moving in opposite directions) whereupon the levers 4 will be drawn toward the center of the car and carry with them the brake beam 2 thus applying the shoes 3 to the wheels 1. If a brake 9 is operated, its connection 5 will draw its corresponding pulleys 6 and with it one end of the corresponding levers 4 the opposite end of the latter being held by its connections passing to the corresponding pulleys 7 and shaft 10.

Our device is simple in construction, effective in use and not liable to get out of order as there are few parts and they are so connected as to co-act together efficiently.

Having thus described our invention, the following is what we claim as new therein and desire to secure by Letters Patent:

1. The combination of a brake beam, a lever pivoted thereto a pulley 6 and connections between them, a connection 5 passing over said pulley and connected at one end to a brake beam, its opposite end passing to and upon a shaft 10 and means for operating said shaft, substantially as described.

2. The combination of a brake beam, pulley 6 and connections between them, a connection passing over said pulley and held at one end, a pulley or sprocket wheel 7 over which said connection passes, a shaft 10 to which said connection is attached and means for operating said shaft, substantially as described.

3. In a brake mechanism, the combination of brake beams, pulleys 6 and connections between said pulleys and said beams, connections 5 passing over said pulleys each of said connections being connected at one end with said brake beams, a shaft 10 to which the opposite ends of said connections are attached and means for operating said shaft whereby said pulleys will be drawn in opposite directions to apply the brake beams to wheels, substantially as and for the purposes set forth.

4. In a brake mechanism, the combination of brake beams, levers 4 pivoted thereto, pulleys 6, connections between said pulleys and said levers, connections 5 respectively connected with the opposite ends of the levers 4 and passing over the pulleys 6, pulleys 7 over which said connections pass, shaft 10 to which said connections are attached and means for operating said connections, substantially as described.

ROBERT H. BULLOCH.
JOHN W. MALLARD.

Witnesses:
JOSEPH GASTON BULLOCH,
HENRY WETHERHORN.